United States Patent
Lee et al.

(10) Patent No.: US 10,523,938 B2
(45) Date of Patent: Dec. 31, 2019

(54) METHOD AND APPARATUS FOR PROCESSING PICTURE HAVING PICTURE HEIGHT NOT EVENLY DIVISIBLE BY SLICE HEIGHT AND/OR SLICE WIDTH NOT EVENLY DIVISIBLE BY PIXEL GROUP WIDTH

(71) Applicant: MEDIATEK INC., Hsin-Chu (TW)

(72) Inventors: Kun-Bin Lee, Taipei (TW);
Tung-Hsing Wu, Chiayi (TW);
Han-Liang Chou, Hsinchu County (TW)

(73) Assignee: MEDIATEK INC., Hsin-Chu (TW)

(*) Notice: Subject to any disclaimer, the term of this patent is extended or adjusted under 35 U.S.C. 154(b) by 290 days.

(21) Appl. No.: 15/031,262

(22) PCT Filed: Oct. 24, 2014

(86) PCT No.: PCT/CN2014/089483
§ 371 (c)(1),
(2) Date: Apr. 21, 2016

(87) PCT Pub. No.: WO2015/058719
PCT Pub. Date: Apr. 30, 2015

(65) Prior Publication Data
US 2016/0261880 A1  Sep. 8, 2016

Related U.S. Application Data

(60) Provisional application No. 61/895,454, filed on Oct. 25, 2013, provisional application No. 61/895,461, (Continued)

(51) Int. Cl.
*H04N 19/119* (2014.01)
*H04N 19/174* (2014.01)
(Continued)

(52) U.S. Cl.
CPC ......... *H04N 19/119* (2014.11); *H04N 19/172* (2014.11); *H04N 19/174* (2014.11);
(Continued)

(58) Field of Classification Search
CPC .................................................. H04N 19/119
(Continued)

(56) References Cited

U.S. PATENT DOCUMENTS 5,907,363 A * 5/1999 Botsford, III .... H04N 21/23406
375/240.05
2005/0122933 A1* 6/2005 Kwon ................... H04W 76/30
370/328

(Continued)

FOREIGN PATENT DOCUMENTS

CN  1968410 A  5/2007
CN  101610417 A  12/2009

(Continued)

OTHER PUBLICATIONS

"International Search Report" dated Jan. 26, 2015 for International application No. PCT/CN2014/089483, International filing date:Oct. 24, 2014.

(Continued)

*Primary Examiner* — Alison Slater
*Assistant Examiner* — Shanika M Brumfield
(74) *Attorney, Agent, or Firm* — Winston Hsu (57) ABSTRACT

An image processing method includes: combining a padding region with a picture, wherein any padding pixel included in the padding region is assigned with a predetermined pixel value; and encoding the picture having the padding region combined therewith. For example, the padding region is directly below a bottom edge of the picture. For another example, all of padding pixels included in the padding region have the same pixel value.

10 Claims, 5 Drawing Sheets

Related U.S. Application Data filed on Oct. 25, 2013, provisional application No. 61/904,490, filed on Nov. 15, 2013.

(51) Int. Cl.

| | | |
|---|---|---|
| *H04N 21/43* | (2011.01) | |
| *H04N 19/172* | (2014.01) | |
| *H04N 19/463* | (2014.01) | |
| *H04N 19/184* | (2014.01) | |
| *H04N 19/436* | (2014.01) | |
| *H04N 19/44* | (2014.01) | |
| *H04N 19/46* | (2014.01) | |
| *H04N 5/08* | (2006.01) | |

(52) U.S. Cl.
CPC ......... *H04N 19/184* (2014.11); *H04N 19/436* (2014.11); *H04N 19/44* (2014.11); *H04N 19/46* (2014.11); *H04N 19/463* (2014.11); *H04N 21/4302* (2013.01); *H04N 5/08* (2013.01)

(58) Field of Classification Search
USPC .......................................... 375/240.02–240.2
See application file for complete search history.

(56) References Cited

U.S. PATENT DOCUMENTS

| | | | | |
|---|---|---|---|---|
| 2006/0072668 A1* | 4/2006 | Srinivasan | ........... | H04N 19/119 375/240.24 |
| 2009/0317009 A1 | 12/2009 | Ren | | |
| 2012/0033730 A1* | 2/2012 | Lee | ........... | H04L 65/607 375/240.12 |
| 2012/0082216 A1* | 4/2012 | Wang | ........... | H04N 19/70 375/240.08 |
| 2012/0207211 A1* | 8/2012 | Song | ........... | H04N 19/176 375/240.03 |
| 2012/0314767 A1* | 12/2012 | Wang | ........... | H04N 19/105 375/240.12 |
| 2012/0320970 A1* | 12/2012 | Drugeon | ........... | H04N 19/563 375/240.02 |
| 2013/0128986 A1* | 5/2013 | Tsai | ........... | H04N 19/61 375/240.24 |
| 2015/0256836 A1* | 9/2015 | Song | ........... | H04N 19/176 375/240.02 |
| 2016/0065993 A1* | 3/2016 | Tanizawa | ........... | H04N 19/119 375/240.26 |

FOREIGN PATENT DOCUMENTS

| | | | | |
|---|---|---|---|---|
| CN | 101803387 A | | 8/2010 | |
| CN | 101822063 A | | 9/2010 | |
| CN | 102640492 A | | 8/2012 | |
| CN | 102939756 A | | 2/2013 | |
| CN | 103339932 A | | 10/2013 | |
| GB | 2281681 A | * | 3/1995 | ............... H04B 3/23 |
| JP | 10224792 A | * | 8/1998 | |
| JP | 2010226672 A | | 10/2010 | |
| JP | 2013509788 A | | 3/2013 | |
| KR | 10-2011-0115986 A | | 10/2011 | |
| KR | 1020130070646 A | | 6/2013 | |
| WO | WO-2007110814 A1 | * | 10/2007 | ............ H03M 5/145 |
| WO | 2012044709 A1 | | 4/2012 | |
| WO | 2012/169184 A1 | | 12/2012 | |
| WO | WO-2012169184 A1 | * | 12/2012 | ........... H04N 19/563 |

OTHER PUBLICATIONS

Vesa Display Stream Compression (DSC) Standard, Version 1.1, 1 Aug. 2014, pp. 1-125, Video Electronics Standard Association.

André Kaup, Object-Based Texture Coding of Moving Video in MPEG-4, IEEE Transactions on Circuits and Systems for Video Technology, vol. 9, No. 1, Feb. 1999, pp. 5-15, XP011014536, IEEE.

* cited by examiner

METHOD AND APPARATUS FOR PROCESSING PICTURE HAVING PICTURE HEIGHT NOT EVENLY DIVISIBLE BY SLICE HEIGHT AND/OR SLICE WIDTH NOT EVENLY DIVISIBLE BY PIXEL GROUP WIDTH

CROSS REFERENCE TO RELATED APPLICATIONS

This application claims the benefit of U.S. provisional application No. 61/904,490 (filed on Nov. 15, 2013), U.S. provisional application No. 61/895,454 (filed on Oct. 25, 2013), and U.S. provisional application No. 61/895,461 (filed on Oct. 25, 2013). The entire contents of the related applications are incorporated herein by reference.

FIELD OF INVENTION

The disclosed embodiments of the present invention relate to image processing with pixel padding, and more particularly, to a method and apparatus for processing a picture having a picture height not evenly divisible by a slice height and/or a slice width not evenly divisible by a pixel group width.

BACKGROUND OF THE INVENTION

A display interface may be disposed between an application processor (AP) and a display driver integrated circuit (DDIC) to transmit display data from the AP to the DDIC for further processing. When a display panel supports a higher display resolution, 2D/3D display with higher resolution can be realized. Hence, the display data transmitted over the display interface would have a larger data size/data rate, which increases the power consumption of the display interface inevitably. If the AP and the DDIC are both located at a portable device (e.g., a smartphone) powered by a battery device, the battery life is shortened due to the increased power consumption of the display interface.

Similarly, a camera interface may be disposed between a camera module and an image signal processor (ISP) to transmit multimedia data from the camera module to the ISP for further processing. The ISP may be part of an application processor. When a camera sensor with a higher resolution is employed in the camera module, the captured image data transmitted over the camera interface would have a larger data size/data rate, which increases the power consumption of the camera interface inevitably. If the camera module and the ISP are both located at a portable device (e.g., a smartphone) powered by a battery device, the battery life is shortened due to the increased power consumption of the camera interface.

Data compression may be employed to reduce the data size/data rate of picture data transmitted over a transmission interface such as the display interface or the camera interface. To enable parallel processing in an encoder side, a decoder side, or both, slice partitioning is proposed. However, it is possible that a picture height of a picture is not evenly divisible by a slice height and/or a slice width of the picture is not evenly divisible by a pixel group width. Pixel padding is therefore needed. However, the slice boundary condition may make the processing more complicated. Hence, there is a need for an innovative design which can simplify the pixel padding of a picture that is partitioned into equal-sized slices.

SUMMARY OF THE INVENTION

In accordance with exemplary embodiments of the present invention, a method and apparatus for processing a picture having a picture height not evenly divisible by a slice height and/or a slice width not evenly divisible by a pixel group width are proposed.

According to a first aspect of the present invention, an exemplary image processing method includes: combining a padding region with a picture, wherein any padding pixel included in the padding region is assigned with a predetermined pixel value; and encoding the picture having the padding region combined therewith.

According to a second aspect of the present invention, an image processing method includes: using a first padding rule for setting first padding pixels beyond a right edge of a picture; using a second padding rule for setting second padding pixels beyond a bottom edge of the picture, wherein the second padding rule is different from the first padding rule; and encoding the picture having the first padding pixels and the second padding pixels combined therewith.

According to a third aspect of the present invention, an exemplary image processing method includes: using a first padding rule for setting first padding pixels beyond a right edge of a picture; generating a bitstream from encoding the picture having the first padding pixels combined therewith; and using a second padding rule for setting a first predetermined bit pattern that stands for an encoding result of at least a portion of second padding pixels beyond a bottom edge of the picture, and padding the first predetermined bit pattern to the bitstream, wherein the second padding rule is different from the first padding rule.

According to a fourth aspect of the present invention, an image processing method includes: receiving a bitstream that is generated from encoding the picture having a first padding region combined therewith, wherein any padding pixel included in the first padding region is assigned with a predetermined pixel value, and the bitstream includes a first bitstream of encoded data of the picture and a second bitstream of encoded data of the first padding region; identifying the second bitstream from the bitstream; and ignoring decoding of at least a portion of the second bitstream.

According to a fifth aspect of the present invention, an exemplary image processing method includes: determining an initial slice width by evenly dividing a picture width of a picture by a target number of slices in a slice row; when the initial slice width has a first value which is not an integer multiple of a pixel group width, determining a final slice width by extending the initial slice width to a second value which is an integer multiple of the pixel group width; and encoding the picture based at least partly on the final slice width.

According to a sixth aspect of the present invention, an exemplary image processing apparatus includes a padding circuit and an encoding circuit. The padding circuit is configured to combine a padding region with a picture, wherein any padding pixel included in the padding region is assigned with a predetermined pixel value. The encoding circuit is configured to encode the picture having the padding region combined therewith.

According to a seventh aspect of the present invention, an exemplary image processing apparatus includes a padding circuit and an encoding circuit. The padding circuit is configured to use a first padding rule for setting first padding pixels beyond a right edge of a picture, and use a second padding rule for setting second padding pixels beyond a bottom edge of the picture, wherein the second padding rule is different from the first padding rule. The encoding circuit is configured to encode the picture having the first padding pixels and the second padding pixels combined therewith.

According to an eighth aspect of the present invention, an exemplary image processing apparatus is disclosed. The exemplary image processing apparatus includes a padding circuit and an encoding circuit. The padding circuit is configured to use a first padding rule for setting first padding pixels beyond a right edge of a picture. The encoding circuit is configured to generate a bitstream from encoding the picture having the first padding pixels combined therewith. The padding circuit is further configured to use a second padding rule for setting a first predetermined bit pattern that stands for an encoding result of at least a portion of second padding pixels beyond a bottom edge of the picture, and pad the first predetermined bit pattern to the bitstream, wherein the second padding rule is different from the first padding rule.

According to a ninth aspect of the present invention, an exemplary image processing apparatus is disclosed. The exemplary image processing apparatus includes an interface circuit and a decoding circuit. The interface circuit is configured to receive a bitstream that is generated from encoding the picture having a first padding region combined therewith, wherein any padding pixel included in the first padding region is assigned with a predetermined pixel value, and the bitstream includes a first bitstream of encoded data of the picture and a second bitstream of encoded data of the first padding region. The decoding circuit is configured to identify the second bitstream from the bitstream, and ignore decoding of at least a portion of the second bitstream.

According to a tenth aspect of the present invention, an exemplary image processing apparatus is disclosed. The exemplary image processing apparatus includes a slice width determination circuit and an encoding circuit. The slice width determination circuit is configured to evenly divide a picture width of a picture by a target number of slices in a slice row to generate an initial slice width; and when the initial slice width has a first value which is not an integer multiple of a pixel group width, determine a final slice width by extending the initial slice width to a second value which is an integer multiple of the pixel group width. The encoding circuit is configured to encode the picture based at least partly on the final slice width.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The present invention proposes applying data compression to a picture and then transmitting a compressed picture over a transmission interface. As the data size/data rate of the compressed picture is smaller than that of the original un-compressed picture, the power consumption of the transmission interface is reduced correspondingly. With regard to the data compression, the present invention proposes adjusting a slice width to a value which is an integer multiple of a pixel group width (e.g., a group size of a one-dimensional group of pixels) and/or assigning a predetermined value to each of padding pixels beyond a picture edge (e.g., a bottom edge of a picture). By way of example, but not limitation, the proposed slice width determination method and/or the proposed padding method may be employed by a coding standard, such as a Video Electronics Standards Association (VESA) display stream compression (DSC), to simply the encoding operation in the encoder side. Further, since each padding pixel beyond the picture edge is assigned with a predetermined value, a bitstream (i.e., a bit pattern) generated from encoding at least a portion (i.e., part or all) of the padding pixels can be known and obtained beforehand. In one exemplary design, no encoding operations (e.g., predictive mode of coding (P-mode) or indexed color history (ICH) coding) are actually applied to at least a portion of the padding pixels, and a predetermined bit pattern generated in advance is directly padded to a bitstream generated from encoding the picture to act as an encoding result of at least a portion of the padding pixels. In another exemplary design, no pixel padding is actually applied to the picture for adding padding pixels beyond the picture edge, and a predetermined bit pattern standing for an encoding result of at least a portion of the padding pixels is directly padded to a bitstream generated from encoding the picture. Further details of the proposed image processing design will be described as below.

Figure 1:
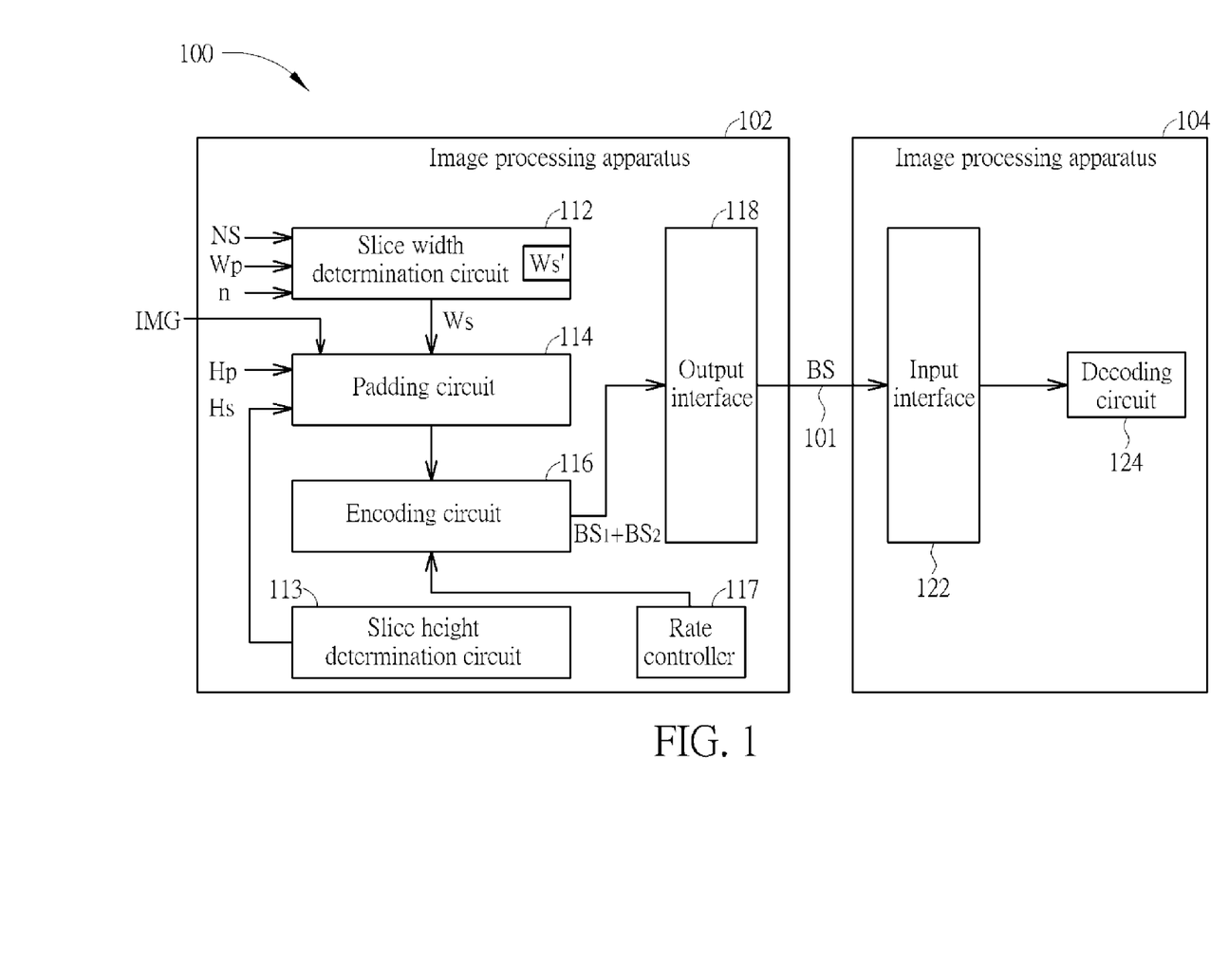
FIG. 1 is a diagram illustrating an image processing system according to an embodiment of the present invention.

FIG. 1 is a diagram illustrating an image processing system according to an embodiment of the present invention. The image processing includes a plurality of image processing apparatuses 102 and 104. The image processing apparatus 102 includes a slice width determination circuit 112, a slice height determination circuit 113, a padding circuit 114, an encoding circuit 116, a rate controller 117, and an output interface 118. Each of the slice width determination circuit 112, the padding circuit 114, and the encoding circuit 116 may be a circuit component of a compressor in the encoder side. The image processing apparatus 104 includes an input interface 122 and a decoding circuit 124, where the decoding circuit 124 may be part of a decompressor in the decoder side. Furthermore, the decoding circuit 124 may perform rate control function similar to that performed by rate controller 117 to improve compression efficiency. It should be noted that only the circuit components pertinent to the present invention are shown in FIG. 1. In practice, one or both of image processing apparatuses 102 and 104 may be configured to have additional circuit components.

The image processing apparatuses 102 and 104 may be implemented in different chips. Hence, the image processing apparatus 102 generates a bitstream BS to the image processing apparatus 104 through a transmission interface 101. Specifically, the output interface 118 of the image processing apparatus 102 communicates with the input interface 122 of the image processing apparatus 104 according to a protocol of the transmission interface 101.

In one exemplary implementation, the image processing apparatus 102 may be implemented in a camera module, and the image processing apparatus 104 may be implemented in an image signal processor (ISP). The ISP may be part of an application processor (AP). A picture IMG to be processed by the proposed image processing apparatus 102 may be derived from an output of a camera sensor in the camera module. In addition, the transmission interface 101 may be a camera serial interface (CSI) standardized by a Mobile Industry Processor Interface (MIPI).

In another exemplary implementation, the image processing apparatus 100 may be implemented in an application processor (AP), and the image processing apparatus 104 may be implemented in a display driver integrated circuit (DDIC). The picture IMG to be processed by the proposed image processing apparatus 102 may be generated in the AP. In addition, the transmission interface 101 may be a display serial interface (DSI) standardized by a Mobile Industry Processor Interface (MIPI).

The image processing apparatus 102 employs the proposed slice width determination method to determine a final slice width $W_S$ referenced for partitioning the picture IMG into slices to be encoded by the encoding circuit 116. All of the slices in the picture IMG have the same size defined by a slice height $H_S$ and a slice width $W_S$. Specifically, the picture IMG is partitioned into a plurality of slice rows according to the slice height $H_S$, where the slice rows are arranged vertically in the picture IMG, and the slice height $H_S$ decides the number of lines (i.e., pixel rows) included in each slice row. Each of the slice rows is partitioned into a plurality of slices according to the slice width $W_S$, where the slices are arranged horizontally in the slice row. Based on a group size (i.e., a size of a pixel group composed of pixels), each slice is divided into a plurality of pixel groups, each acting as a basic compression unit processed by the encoding circuit 116. For example, each pixel group may be an m×n pixel block, where m represents a pixel group height, n represents a pixel group width, and m and n are positive integers. When m=1, each pixel group is a one-dimensional pixel block. When m>1, each pixel group is a two-dimensional pixel block.

In this embodiment, the slice width determination circuit 112 is responsible for calculating the final slice width $W_S$ based on a picture width $W_P$ of the picture IMG, a target number of slices in a slice row NS, and a pixel group width n of each pixel group in each slice. The slice width determination circuit 112 evenly divides the picture width $W_P$ by the target number of slices in one slice row NS to generate an initial slice width $W_S'$ (i.e., $W_S'=W_P/NS$). Next, the slice width determination circuit 112 checks if the initial slice width $W_S'$ is an integer multiple of the pixel group width n. It should be noted that, when the pixel group is one-dimensional, the pixel group width is a group size of the one-dimensional pixel group.

Consider a case where the initial slice width $W_S'$ is an integer multiple of the pixel group width n. The slice width determination circuit 112 sets the final slice width $W_S$ by the initial slice width $W_S'$ (i.e., $W_S=W_S'$). When the slice width $W_S$ is used for partitioning the picture IMG into slices, no pixel padding is needed at the right edge of each slice due to the fact that the slice width of each slice is evenly divisible by the pixel group width.

Figure 2:
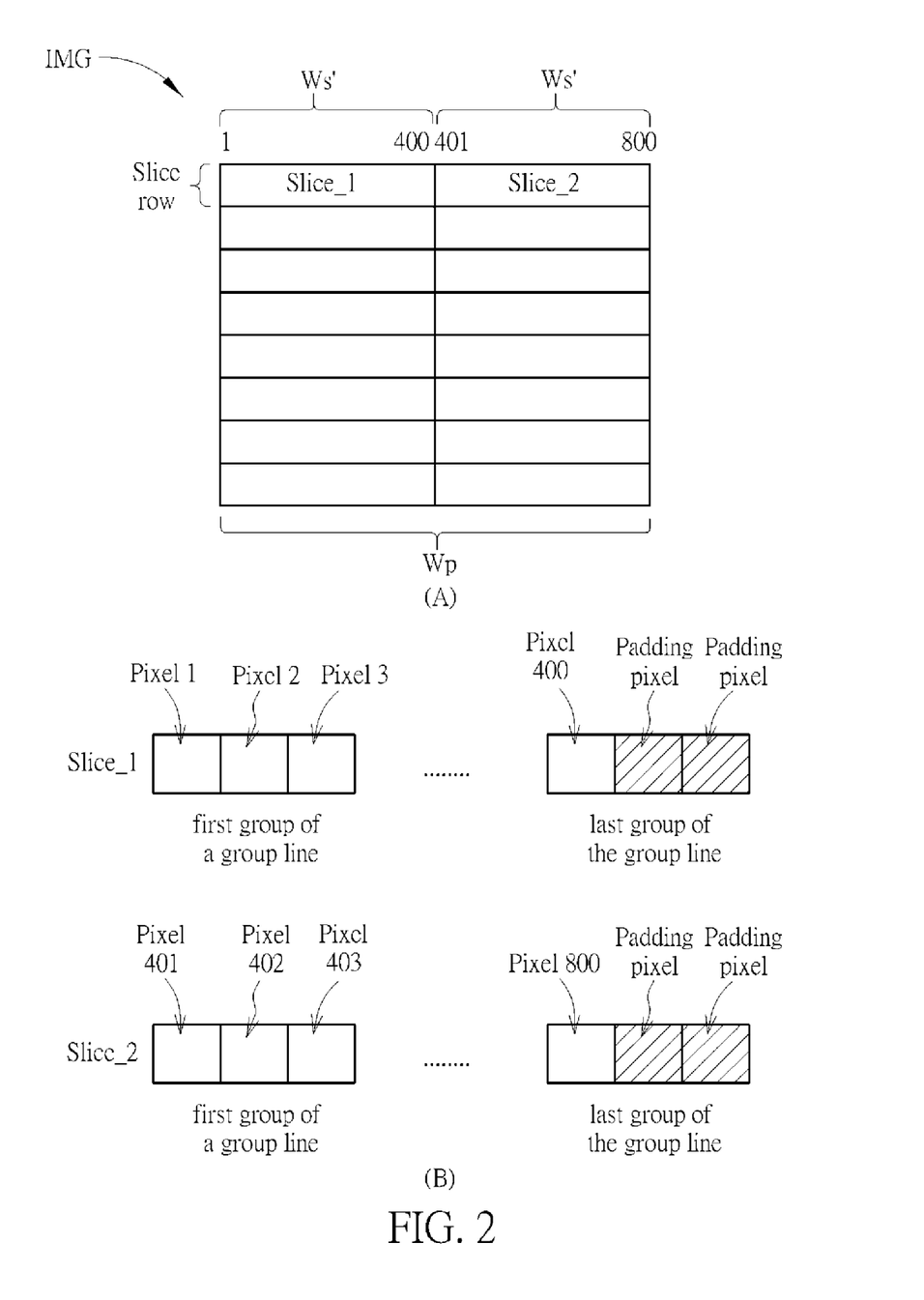
FIG. 2 is a diagram illustrating pixel padding applied to a picture partitioned based on a slice width not evenly divisible by a pixel group width.

Consider another case where the initial slice width $W_S'$ is not an integer multiple of the pixel group width n. If the final slice width $W_S$ is set by the initial slice width $W_S'$ and then used for partitioning the picture IMG into slices, pixel padding is needed at the right edge of each slice due to the fact that the slice width of each slice is not evenly divisible by the pixel group width. FIG. 2 is a diagram illustrating pixel padding applied to the picture IMG partitioned based on a slice width not evenly divisible by the pixel group width. Suppose that the picture width is 800, the slice width $W_S'$ is 400, and each pixel group is a one-dimensional pixel group having 3 pixels (i.e., m=1 and n=3). In this example, each slice row of the original picture IMG is equally divided into two slices; however, the slice width $W_S'$ is set by a value that is not evenly divisible by the pixel group width. There would be 134 pixel groups in a group line of each slice, and each slice would have 400 pixels with two extra pixels that are padded in the last pixel group (i.e., rightmost pixel group) of the group line. As shown in sub-diagram (A) of FIG. 2, one slice row includes two slices Slice_1 and Slice_2, each having a slice width set by $W_S'$. The slice width $W_S'$ is not divisible by 3. Concerning the slice Slice_1 shown in sub-diagram (B) of FIG. 2, the last pixel group of a group line includes one pixel 400 originally included in the picture IMG and two padding pixels beyond the right edge of the slice Slice_1. Similarly, concerning the slice Slice_2 shown in sub-diagram (B) of FIG. 2, the last pixel group (i.e., rightmost pixel group) of the group line includes one pixel 800 originally included in the picture IMG and two padding pixels beyond the right edge of the slice Slice_2. Since the slice Slice_2 is the last slice (i.e., rightmost slice) in one slice row, the pixel padding of the slice Slice_2 extends beyond the right edge of the picture IMG. In one exemplary design, the padding circuit 114 employs a first padding rule to set padding pixels beyond the right edge of the picture IMG. For example, the first padding rule defines that a rightmost pixel in each line of the picture is repeated, resulting in padding pixels combined with rightmost slices in slice rows. Hence, the pixel 800 is replicated to form each of the following two padding pixels for the last pixel group of a group line in the slice Slice_2. Under the first padding rule, although the slice width $W_S'$ is not an integer multiple of the pixel group width, the group line of a slice being encoded is an integer multiple of the pixel group width. For example, the slice width $W_S'$ is 400 and the pixel number in the group line of a slice to be encoded is 402, wherein two of encoded pixels are the padding pixels.

To reduce the frequency of performing the pixel padding and simplify the encoding operation, the slice width determination circuit 112 is configured to determine the final slice width $W_S$ by adjusting the initial slice width $W_S'$. For example, when the initial slice width $W_S'$ has a first value which is not an integer multiple of the pixel group width n, the slice width determination circuit 112 determines the final slice width $W_S$ by extending the initial slice width $W_S'$ to a second value which is an integer multiple of the pixel group size n. The computation of the final slice width $W_S$ may be expressed using the following equation.

$$W_S = n \times \left\lceil \frac{W_S'}{n} \right\rceil; \quad (1)$$

In above equation (1), $\lceil \ \rceil$ represents a ceiling function used to find a smallest integer that is not smaller than $$\frac{W_S'}{n}.$$

Figure 3:
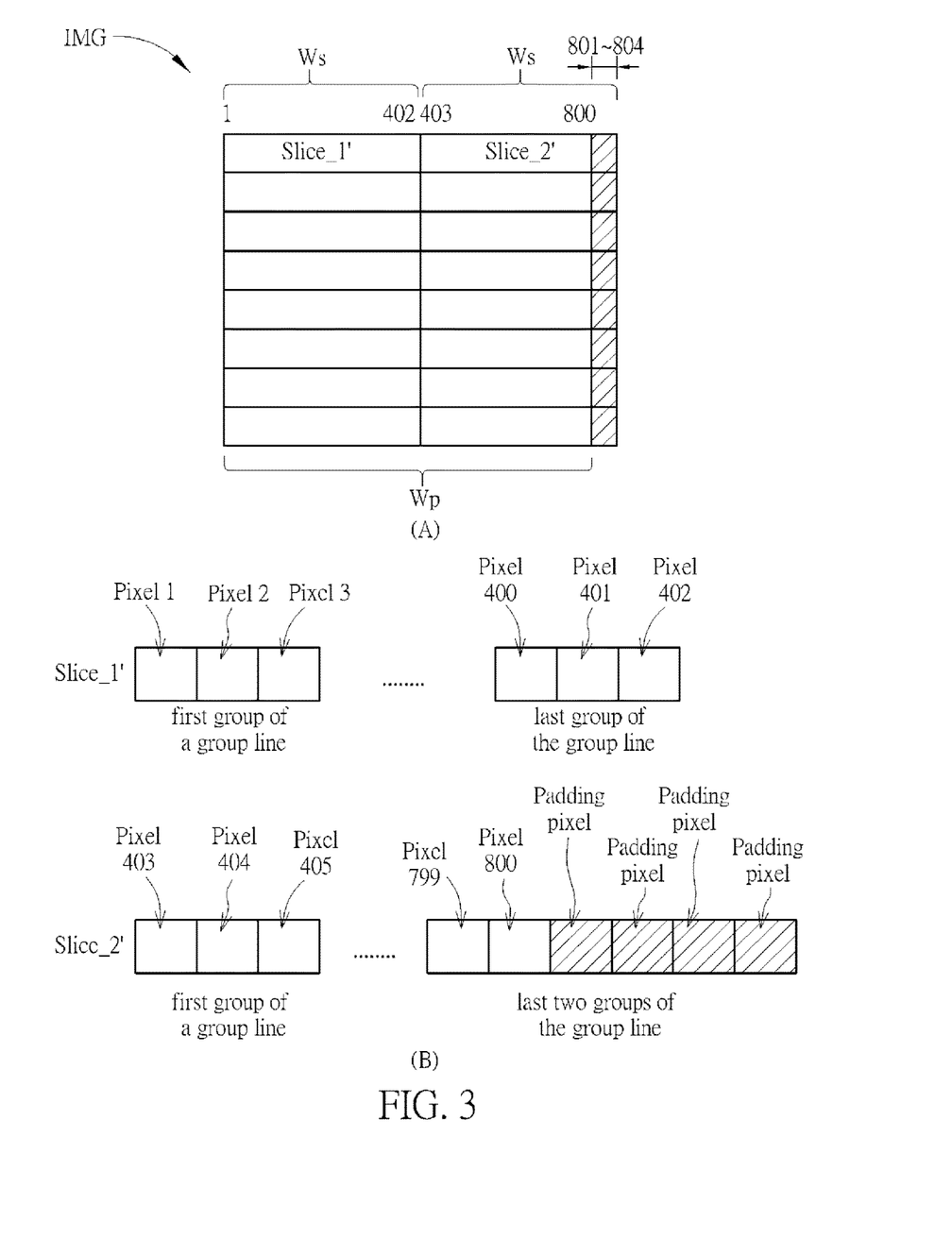
FIG. 3 is a diagram illustrating pixel padding applied to a picture partitioned based on a slice width evenly divisible by a pixel group width.

When the final slice width $W_S$ is referenced for partitioning the picture IMG into slices, pixel padding is only needed at the right edge of the last slice (i.e., rightmost slice) in each slice row due to the fact that the slice width of each slice is properly controlled to have a value evenly divisible by the pixel group width. FIG. 3 is a diagram illustrating pixel padding applied to the picture IMG partitioned based on a slice width evenly divisible by the pixel group width. Suppose that the picture width is 800, the initial slice width $W_S'$ is 400, and each pixel group is a one-dimensional pixel group having 3 pixels (i.e., m=1 and n=3). In this example, each slice row of the original picture IMG is unequally divided into two slices; however, the slice width $W_S$ is set by a value that is evenly divisible by the pixel group width. To be specific, in this example, each slice row of the original picture IMG is unequally divided into two slices. The final slice width $W_S$ is set by a value that is evenly divisible by the pixel group width. Alternatively, the slice width of slice_1' is set as a multiple of pixel group width while the slice width of slice_2' is set as a difference between the picture width $W_P$ of the picture IMG and the slice width of slice_1'. Hence, in accordance with the above equation (1), the initial slice width $W_S'$ with a value of 400 will be extended to the final slice width $W_S$ with a value of 402, thereby making a slice width evenly divisible by a pixel group width. There would be 134 pixel groups in a group line of each slice, and each slice would have 402 pixels. As shown in sub-diagram (A) of FIG. 3, one slice row includes two slices Slice_1' and Slice_2', each having a slice width set by $W_S$. The slice width $W_S$ is divisible by 3. Concerning the slice Slice_1' shown in sub-diagram (B) of FIG. 3, it includes pixels 1-402 in a group line, and each pixel group in the group line has 3 pixels originally included in the picture IMG. Concerning the slice Slice_2' shown in sub-diagram (B) of FIG. 3, it includes pixels 403-800 and 4 padding pixels beyond the right edge of the slice Slice_2', such that the last two pixel groups have padding pixels included therein. Since the slice Slice_2 is the last slice (i.e., rightmost slice) in one slice row, the pixel padding of the slice Slice_2 extends beyond the right edge of the picture IMG. In one exemplary design, the padding circuit 114 employs a first padding rule to set padding pixels beyond the right edge of the picture IMG. For example, the first padding rule defines that a rightmost pixel in each line of the picture is repeated, resulting in padding pixels combined with rightmost slices in slice rows. Hence, the pixel 800 is replicated to form each of the following four padding pixels for the last two groups of a group line in the slice Slice_2. Under the first padding rule, although the initial slice width $W_S'$ is not an integer multiple of the pixel group width, the group line of a slice being encoded is an integer multiple of the pixel group width. For example, the final slice width Ws of the slices Slice_2' is 402 and the pixel number in the group line of the slices Slice_2' to be encoded is 402, wherein four of encoded pixels are the padding pixels.

When the proposed slice width determination method is employed, only the rightmost slice (e.g., Slice_2' in FIG. 3) in a slice row has padding pixels. In other words, any non-rightmost slice in a slice row has no padding pixels combined therewith. In this way, the pixel padding operation can be simplified.

Figure 4A:
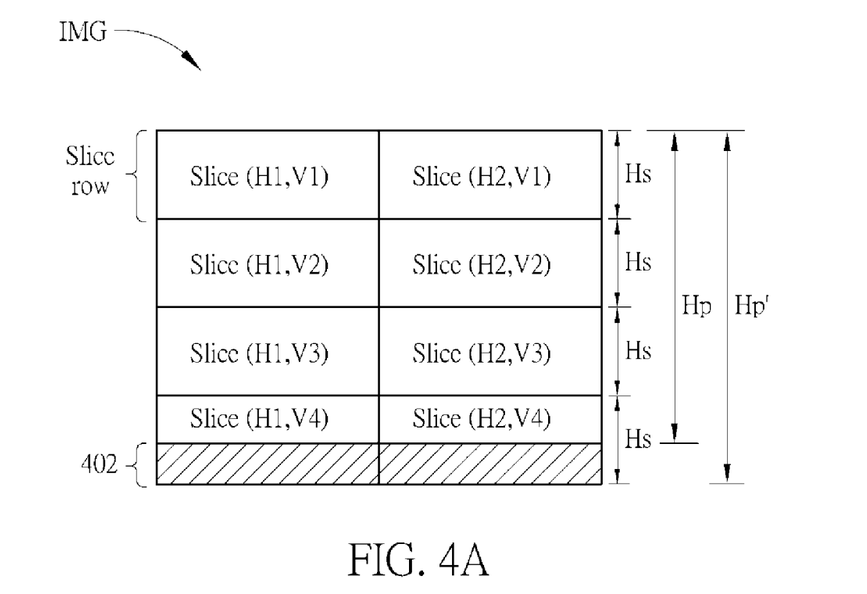
FIG. 4A is a diagram illustrating a padding region added to a picture according to an embodiment of the present invention.
Figure 4B:
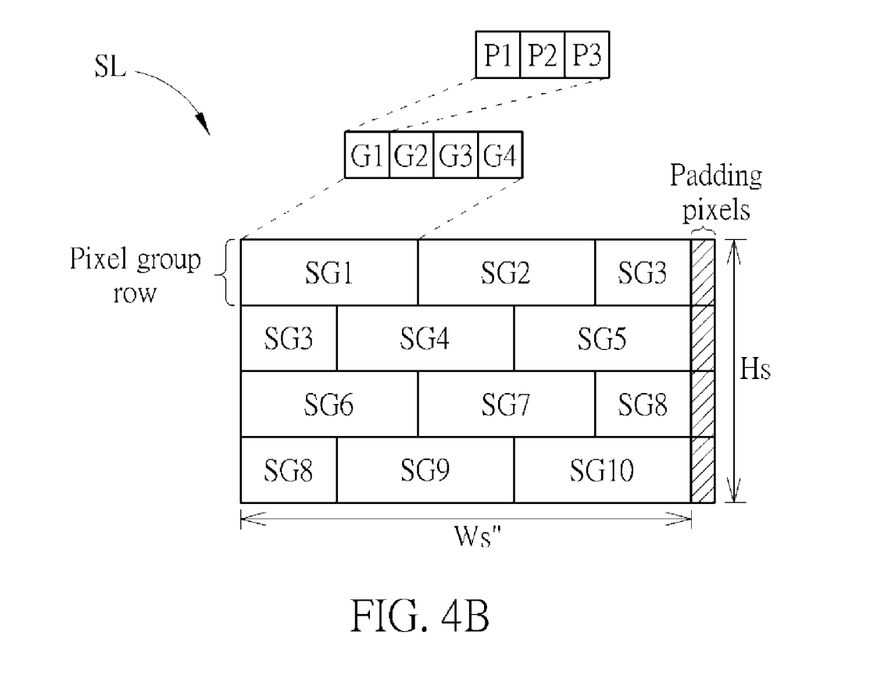
FIG. 4B is a diagram illustrating a partition setting of a slice in a picture according to an embodiment of the present invention.

Besides padding pixel beyond a right edge of a slice/picture, the encoding operation of the picture may need to pad pixel beyond a bottom edge of the picture. All of the slices in the same picture are required to have the same slice height. When a picture height is not evenly divisible by the slice height, padding pixels will be added beyond the bottom edge of the picture. FIG. 4A is a diagram illustrating a padding region added to the picture IMG according to an embodiment of the present invention. In this example, the image processing apparatus 102 partitions the picture IMG into eight slices including Slice (H1, V1), Slice (H1, V2), Slice (H1, V3), Slice (H1, V4) arranged vertically and Slice (H2, V1), Slice (H2, V2), Slice (H2, V3), Slice (H2, V4) arranged vertically. FIG. 4B is a diagram illustrating a partition setting of a slice SL in the picture IMG according to an embodiment of the present invention. For example, the slice SL may be one of the slices Slice(H1, V1)-Slice(H1, V4) and Slice(H2, V1)-Slice(H2, V4). Each slice may include at least one pixel group row, and each pixel group row may include at least one pixel group. In this example, the slice SL has four pixel group rows, where each pixel group row is defined to have a plurality of pixel groups, and each pixel group is defined to include three pixels. For example, the pixel group G1 has pixels P1-P3. It should be noted that, in an alternative design, each pixel group may be a two-dimensional pixel block. Further, multiple pixel groups may be regarded as one supergroup. As shown in FIG. 4B, there are ten supergroups SG1-SG10 in the slice SL, where each supergroup has four pixel groups. For example, the supergroup SG1 has pixel groups G1-G4. A supergroup that includes pixel group(s) of one pixel group row may wrap around to include pixel group(s) in the next pixel group row, such as SG3 and SG8.

It is possible that the slice width $W_S''$ is not evenly divisible by the pixel group width (e.g., a group size of a one-dimensional group of pixels). Hence, pixel padding is needed at a right edge of such a slice. For example, when the slice SL is one of the slices Slice(H2, V1)-Slice(H2, V4), the right edge of the slice SL is also a right edge of the picture IMG. The rightmost pixel in each line (i.e., pixel row) of the picture IMG is repeated, resulting in padding pixels appended to rightmost slices in slice rows. For another example, when the slice SL is one of the slices Slice(H1, V1)-Slice(H1, V4), the right edge of the slice SL is not the right edge of the picture IMG, and the methods of setting the padding pixels beyond the right edge of the slice SL depend on coding modes of last pixel groups in pixel group rows of the slice SL. Specifically, concerning each line (i.e., pixel row) of the slice SL, one or more padding pixels may be added to the right of the rightmost pixel based at least partly on a coding mode (e.g., P-mode or ICH-mode) of a pixel group to which the rightmost pixel belongs. If the last pixel group is coded in ICH-mode, the index used for the rightmost pixel shall be duplicated to pad the entropy coding unit to have 3 indices. If the last pixel group is coded in P-mode, any residuals that correspond with pixels beyond the right edge of the slice shall be set to zero.

As mentioned above, it is possible that a picture width of the picture IMG is not evenly divisible by a slice height. For clarity and simplicity, the padding pixels beyond the right edge of the picture IMG are not illustrated in FIG. 4A. It is also possible that the picture height $H_P$ of the picture IMG is not evenly divisible by the slice height $H_S$. The padding circuit 114 therefore employs a second padding rule to set padding pixels beyond a bottom edge of the picture IMG, thereby adding padding pixels to the bottommost/last slice row to make the bottommost/last slice row have the desired slice height $H_S$. As shown in FIG. 4A, there is a padding region (or called pseudo picture region) 402 directly below the bottom edge of the picture IMG. Hence, the padding pixels added below the last line (i.e., the last pixel row) of the picture IMG are used to serve as part of the slices Slice (H1, V4) and Slice (H2, V4) of the bottommost/last slice row, thereby making each of the slices has the same slice height $H_S$. Under the second padding rule, the extended picture height $H_P'$ would be an integer multiple of the slice height $H_S$.

The second padding rule used for setting padding pixels beyond the bottom edge of the picture is different from the first padding rule used for setting padding pixels beyond the right edge of the picture. As mentioned above, the first padding rule defines setting the padding pixels by replicating pixels located at the picture edge (e.g., pixels located at the rightmost/last pixel column of the picture). By way of example, the second padding rule defines using at least one predetermined pixel value (i.e., at least one pre-defined pixel value that is generated in advance) to set the padding pixels. It should be noted that, when the second padding rule is employed, pixel values of padding pixels do not depend on pixel values of pixels located at the picture edge (e.g., pixels located at the bottommost/last pixel row of the picture). It should be noted that the predetermined pixel value would be adjusted according to the bit depth for each color component. For example, the predetermined pixel value would be set as different values for 8-bit and 10-bit color component. Hence, the image processing apparatus 102 may set the padding pixels according to a bit depth indicator. For example, the bit depth indicator may be implemented as a register or implemented by other hardware-based means. In one exemplary implementation, all of padding pixels set by the second padding rule may have the same pixel value. For example, each of the padding pixels included in the padding region 402 may be set by a white pixel. For another example, each of the padding pixels included in the padding region 402 may be set by a black pixel. For yet another example, each of the padding pixels included in the padding region 402 may be set by using a midpoint sample value for each color component. Taking the YCoCg color space for example, each padding pixel with an 8-bit depth for each color component may have the pseudo luminance value Y=0x80, the orange chrominance value Co=0x100, and the green chrominance value Cg=0x100. It should be noted that the midpoint sample value for each color component would be adjusted when the bit depth for each color component changes. Further, different color spaces may have different settings of midpoint sample values for color components. Hence, the image processing apparatus 102 may set the padding pixels according to a color space indicator. For example, the color space indicator may be implemented as a register or implemented by other hardware-based means.

In the present invention, the slice height determination circuit 113 is configured to set the slice height $H_S$. For example, the slice height $H_S$ may be determined based on a compression ratio CR of a compressed picture generated from encoding the picture IMG, where $$CR = \frac{\text{Compressed data size}}{\text{Uncompressed data size}}.$$

In a case where the picture height $H_P$ is an integer multiple of $$\frac{1}{CR},$$

the slice height $H_S$ may be set by an integer multiple of $$\frac{1}{CR}.$$

Hence, the picture height $H_P$ is still kept as an integer multiple of the slice height $H_S$. For example, when CR=⅓, the slice height $H_S$ is set by a value 3*K, where K is a positive integer. Consider another case where the picture height $H_P$ is not an integer multiple of $$\frac{1}{CR}.$$

If pixel padding beyond a bottom edge of a picture is preferred, the slice height $H_S$ may be set by an integer multiple of $$\frac{1}{CR}.$$

Hence, due to the pixel padding, the extended picture height $H_P'$ would be an integer multiple of the slice height $H_S$. If pixel padding beyond a bottom edge of a picture is not preferred, the picture height $H_P$ is kept as an integer multiple of the slice height $H_S$. For another example, the slice height $H_S$ may be set based on a condition that $$\frac{\text{bitrate of encoded data of pixel group line in a slice}}{\text{transmission rate of a transmission interface}}$$

is an integer.

When a padding region is determined, the padding circuit 114 is configured to assign a predetermined pixel value to any padding pixel included in the padding region. The padding region is beyond a picture edge and added to the picture to ensure that all slices have the same size. For example, the padding region is directly below a bottom edge of the picture IMG. In one preferred embodiment, all of padding pixels included in the padding region have the same pixel value (i.e., the same predetermined pixel value).

With regard to the example shown in FIG. 4A, the padding circuit 114 needs to determine the padding region 402 directly below the bottom edge of the picture IMG because the picture height $H_P$ is not evenly divisible by the slice height $H_S$ determined by the slice height determination circuit 113. For example, the padding circuit 114 is configured to receive information of a first picture height (e.g., the original picture height $H_P$ of the picture IMG); determine a second picture height (e.g., an extended picture height $H_P'$ of the picture IMG) to be an integer multiple of the slice height $H_S$ when the first picture height is not an integer multiple of the slice height $H_S$; and determine a padding region (e.g., padding region 402) directly below the bottom edge of the picture IMG according to the slice height $H_S$ and the second picture height.

The encoding circuit 116 is configured to encode the picture IMG having padding pixels combined therewith. For example, the padding pixels may include first padding pixels and second padding pixels, where the first padding pixels are located beyond the right edge of the picture IMG and set by the first padding rule, and the second padding pixels are located beyond the bottom edge of the picture IMG and set by the second padding rule. Since the padding region 402 is composed of padding pixels each having a predetermined pixel value, the encoding result of at least a portion (i.e., part or all) of the padding region 402 can be known in advance. In one exemplary design, the encoding circuit 116 directly outputs a predetermined bitstream as an encoding result of at least a portion of the padding region 402, without actually performing the coding operations (e.g., P-mode coding or ICH coding) upon at least the portion of the padding region 402. For example, the predetermined bitstream can be calculated in advance. For another example, the predetermined bitstream is copied from a preceding bitstream generated from actually performing the coding operations (e.g., P-mode coding or ICH coding) upon a preceding portion of the padding region 402. In accordance with the encoding order, the preceding portion of the padding region 402 is processed before at least the portion of the padding region 402.

In a case where all of the padding pixels in the padding region 402 have the same predetermined value, it is easier to compress the padding region 402. The rate controller 117 may apply bit rate control to each compression/encoding operation to ensure that encoded data of a slice satisfies a bit budget allocated to the slice. Hence, the rate controller 117 may allocate less bit budget to the padding region 402 compared to the original picture region. For example, the rate controller 117 may determine a bit budget of one true pixel group line based on a bit budget allocated to the picture IMG and the number of true pixel group lines originally included in the picture IMG. The bit budget of one true pixel group line may be calculated according to the following equation.

$$BB_{GL} = \frac{BB_{PIC}}{N_{GL}}; \qquad (2)$$

In above equation (2), $BB_{GL}$ represents the bit budget of one true pixel group line, $BB_{PIC}$ represents the bit budget allocated to the picture IMG, and $N_{GL}$ represents the number of true pixel group lines.

The bottommost/last slice row includes true pixel group line(s) originally included in the picture IMG and padding pixel group line(s) in the padding region 402. The bit budget of the bottommost/last slice row may be set according to according to the following equation.

$$BB_{LASTSG} = BB_{GL} \times N_{SGGL} + OFFSET; \qquad (3)$$

In above equation (3), $BB_{LASTSG}$ represents the bit budget of the bottommost/last slice row, $N_{SGGL}$ represents the number of true pixel group lines in the bottommost/last slice row, and OFFSET represents a bit budget allocated for the padding region 402. It should be noted that the value OFFSET depends on the padding region 402.

Regarding a slice row that is not the bottommost/last slice row, it includes true pixel group lines only, where the number of true pixel group lines is equal to the slice height $H_S$. The bit budget of a slice row that is not the bottommost/last slice row may be set according to according to the following equation.

$$BB_{SG} = BB_{GL} \times H_S; \qquad (4)$$

In above equation (4), $BB_{SG}$ represents the bit budget of a slice that is not the bottommost/last slice row.

Moreover, the encoding circuit 116 may employ a third padding rule for padding a predetermined bit pattern (e.g., 0's) to a specific bitstream generated from encoding a slice of the picture IMG to ensure that a sum of the size of the specific bitstream and a size of the predetermined bit pattern is equal to a bit budget allocated to the slice by the rate controller 117.

The output interface 118 generates the bitstream BS, including at least a first bitstream $BS_1$ of encoded data of the picture IMG and a second bitstream $BS_2$ of encoded data of the padding region 402, to the image processing apparatus 104 via the transmission interface 101. For example, the transmission interface 101 may be a display interface or a camera interface. In addition, the image processing apparatus 102 may further transmit information of the slice height $H_S$ and the first picture height (i.e., the original picture height $H_P$ of the picture IMG) to the image processing apparatus 104 via the bitstream BS. The input interface 122 receives the bitstream BS from the transmission interface 101. Hence, the decoding circuit 124 can derive information of the slice height $H_S$ and the first picture height (i.e., the original picture height $H_P$ of the picture IMG) from the bitstream BS received by the input interface 122. When the first picture height is not an integer multiple of the slice height, the decoding circuit 124 determines a second picture height (e.g., the extended picture height $H_P'$ of the picture IMG) to be an integer multiple of the slice height, and identifies the second bitstream $BS_2$ from the bitstream BS according to at least the slice height and the second picture height. Furthermore, the decoding circuit 124 may identify the second bitstream $BS_2$ with position information. The position information may be determined by pixel coordination information. When decoding process reaches the picture height Hp, then the remaining bitstream is identified as the second bitstream $BS_2$. Alternatively, when finding that decoding process reaches the last slice row, the decoding circuit 124 identifies decoding process reaches the pixel coordination difference Hp'−Hp, and then treats the remaining bitstream as the second bitstream $BS_2$. The padding region 402 will not be displayed on a display screen. In this embodiment, the decoding circuit 124 is configured to ignore decoding of at least a portion (i.e., part or all) of the second bitstream $BS_2$ identified from the bitstream BS, thus simplifying the decoding operation in the decoder side.

If there are more than one slice in a slice row, the decoding circuit 124 may have different slice decoding circuit for each slice in a slice row. The bitstream BS is demultiplexed and bitstream portion of each slice is transferred into each slice decoding circuit. Then each slice decoding circuit identifies its own $BS_2$ portion. In the case that decoding circuit 124 has a slice decoding circuit for decoding more than one slice (i.e., time sharing way). The slice decoding circuit identifies bitstream $BS_2$ of each slice. In some cases, only bitstream portion of the last slice of the last slice row is identified to simplify the design complexity of the decoding circuit 124.

The bitstream BS may further include a third bitstream of encoded data of another padding region different from the aforementioned padding region directly below the bottom edge of the picture. For example, the another padding region may include padding pixels beyond a right edge of a picture (or a right edge of a slice). The decoding circuit 124 is configured to further identify the third bitstream from the bitstream BS, and decode at least a portion of the third bitstream.

In the exemplary embodiment shown in FIG. 1, the padding circuit 114 is configured to actually combine the padding region 402 with the picture IMG, such that the picture IMG and the padding region 402 are both fed into the encoding circuit 116 for data compression. Since the padding region 402 is composed of padding pixels each having a predetermined pixel value, the encoding result of at least a portion (i.e., part or all) of the padding region 402 can be known in advance. Alternatively, the operation of adding the padding region 402 to the picture IMG may be omitted to further simply the encoding operation in the encoder side.

Figure 5:
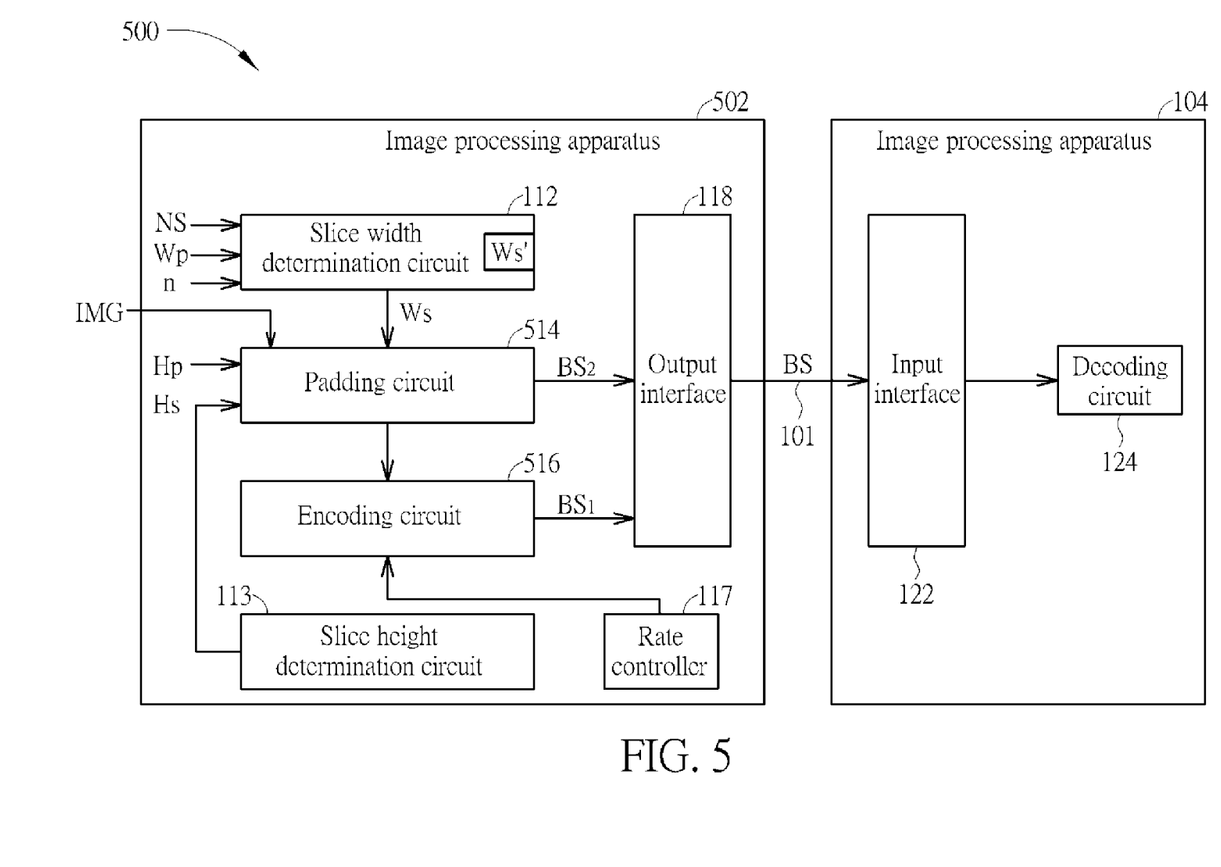
FIG. 5 is a diagram illustrating another image processing system according to an embodiment of the present invention.

FIG. 5 is a diagram illustrating another image processing system according to an embodiment of the present invention. The image processing system 500 includes an image processing apparatus 502 in an encoder side and the aforementioned image processing apparatus 104 in a decoder side. The image processing apparatus 502 also uses the aforementioned first padding rule for setting first padding pixels beyond the right edge of the picture IMG. The difference between the image processing apparatuses 102 and 502 is that the image processing apparatus 502 uses a second padding rule for setting a predetermined bit pattern that stands for an encoding result of at least a portion (i.e., part or all) of second padding pixels beyond the bottom edge of the picture IMG, and adds the predetermined bit pattern to a bitstream (which is generated from the encoding circuit 516 encoding the picture IMG having the first padding pixels combined therewith).

When the picture height $H_p$ of the picture IMG is not evenly divisible by the slice height $H_S$ determined by the slice height determination circuit 113, the padding circuit 514 determines location and size of the padding region 402 beyond the bottom edge of the picture IMG, without actually combining the padding region 402 with the picture IMG. Hence, no padding region beyond the bottom edge of the picture IMG is fed into the encoding circuit 516. As mentioned above, the present invention proposes using the padding region 402 filled with padding pixels each having a predetermined pixel value. The encoding result of at least a portion (i.e., part or all) of the padding region can be known in advance. Hence, the padding circuit 514 employs the second padding rule for setting the predetermined bit pattern (which stands for the encoding result of at least the portion of the padding region), wherein the second padding rule is different from the first padding rule which replicates pixels located at the picture edge (e.g., pixels located at the rightmost/last pixel column of the picture). For example, the predetermined bit pattern that stands for a bitstream of encoded data of a pixel group that each of the pixels has a midpoint sample value for each color component, and the pixel group is encoded by the ICH coding. For another example, the predetermined bit pattern that stands for a bitstream of encoded data of a pixel group that each of the pixels has a midpoint sample value for each color component, and the pixel group is encoded by the P-mode coding. The same objective of generating the bitstream BS, including at least the first bitstream $BS_1$ of encoded data of the picture IMG and the second bitstream $BS_2$ of encoded data of the padding region 402, to the image processing apparatus 104 via the transmission interface 101 is achieved.

Similarly, the encoding circuit 516 may employ the aforementioned third padding rule for padding another predetermined bit pattern (e.g., 0's) to a specific bitstream generated from encoding a slice of the picture IMG to ensure that a sum of the size of the specific bitstream and a size of the another predetermined bit pattern is equal to a bit budget allocated to the slice by the rate controller 117.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. An image processing method, comprising:
using a first padding rule for setting first padding pixels beyond a right edge of a picture, wherein the first padding rule defines that a pixel value of each padding pixel that is directly to the right of the right edge of the picture depends on a pixel value of a pixel located at the right edge of the picture;
using a second padding rule for setting second padding pixels beyond a bottom edge of the picture, wherein the second padding rule is different from the first padding rule, and the second padding rule defines that a pixel value of each padding pixel that is directly below the bottom edge of the picture does not depend on a pixel value of a pixel located at the bottom edge of the picture;
encoding the picture having the first padding pixels and the second padding pixels combined therewith; and
after a bitstream is generated from encoding a slice of the picture, padding a predetermined bit pattern to the bitstream to ensure that a sum of a size of the bitstream and a size of the predetermined bit pattern is equal to a bit budget allocated to the slice, wherein the slice comprises padding pixels each being one of the second padding pixels.

2. The image processing method of claim 1, wherein any of the second padding pixels is assigned with a predetermined pixel value.

3. The image processing method of claim 2, wherein the predetermined pixel value includes a midpoint sample value for each color component.

4. The image processing method of claim 1, wherein all of the second padding pixels have a same pixel value.

5. An image processing method, comprising:
using a first padding rule for setting first padding pixels beyond a right edge of a picture;
generating a bitstream from encoding the picture having the first padding pixels combined therewith;
using a second padding rule for setting a first predetermined bit pattern and padding the first predetermined bit pattern to the bitstream, wherein the first predetermined bit pattern stands for an encoding result of at least a portion of second padding pixels beyond a bottom edge of the picture, the first predetermined bit pattern is not generated from actually encoding said at least a portion of the second padding pixels, and the second padding rule is different from the first padding rule; and after a specific bitstream generated from encoding a slice of the picture is generated, padding a second predetermined bit pattern to the specific bitstream to ensure that a sum of a size of the specific bitstream and a size of the second predetermined bit pattern is equal to a bit budget allocated to the slice, wherein the slice comprises padding pixels each being one of the second padding pixels.

6. The image processing method of claim 5, wherein any of the second padding pixels is assigned with a predetermined pixel value.

7. The image processing method of claim 6, wherein the predetermined pixel value includes a midpoint sample value for each color component.

8. The image processing method of claim 5, wherein all of the second padding pixels have a same pixel value.

9. An image processing apparatus, comprising:
a padding circuit, configured to use a first padding rule for setting first padding pixels beyond a right edge of a picture, and use a second padding rule for setting second padding pixels beyond a bottom edge of the picture, wherein the second padding rule is different from the first padding rule, the first padding rule defines that a pixel value of each padding pixel that is directly to the right of the right edge of the picture depends on a pixel value of a pixel located at the right edge of the picture, and the second padding rule defines that a pixel value of each padding pixel that is directly below the bottom edge of the picture does not depend on a pixel value of a pixel located at the bottom edge of the picture; and
an encoding circuit, configured to encode the picture having the first padding pixels and the second padding pixels combined therewith;

wherein after a bitstream is generated from encoding a slice of the picture, the encoding circuit is further configured to pad a predetermined bit pattern to the bitstream to ensure that a sum of a size of the bitstream and a size of the predetermined bit pattern is equal to a bit budget allocated to the slice, where the slice comprises padding pixels each being one of the second padding pixels.

10. An image processing apparatus, comprising:
a padding circuit, configured to use a first padding rule for setting first padding pixels beyond a right edge of a picture; and
an encoding circuit, configured to generate a bitstream from encoding the picture having the first padding pixels combined therewith;
wherein the padding circuit is further configured to use a second padding rule for setting a first predetermined bit pattern and pad the first predetermined bit pattern to the bitstream; the first predetermined bit pattern stands for an encoding result of at least a portion of second padding pixels beyond a bottom edge of the picture; the first predetermined bit pattern is not generated from actually encoding said at least a portion of the second padding pixels; and the second padding rule is different from the first padding rule; and
wherein after a specific bitstream generated from encoding a slice of the picture is generated, the encoding circuit is further configured to pad a second predetermined bit pattern to the specific bitstream to ensure that a sum of a size of the specific bitstream and a size of the second predetermined bit pattern is equal to a bit budget allocated to the slice, where the slice comprises padding pixels each being one of the second padding pixels.

* * * * *